(12) United States Patent
Chen

(10) Patent No.: US 7,243,931 B2
(45) Date of Patent: Jul. 17, 2007

(54) TURNING DEVICE FOR A WHEEL SET

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 190 days.

(21) Appl. No.: 11/195,634

(22) Filed: Aug. 3, 2005

(65) Prior Publication Data
US 2007/0052191 A1   Mar. 8, 2007

(51) Int. Cl.
*B62M 1/12* (2006.01)
(52) U.S. Cl. .............. 280/87.042; 280/89; 280/124.11; 403/113
(58) Field of Classification Search ........... 280/87.042, 280/89, 124.111; 403/112, 113, 116, 117
See application file for complete search history.

(56) References Cited
U.S. PATENT DOCUMENTS 4,955,626 A * 9/1990 Smith et al. ........... 280/87.042
5,169,166 A * 12/1992 Brooks ................... 280/87.042
6,520,517 B1 * 2/2003 Chung et al. ........... 280/87.042
6,834,734 B2 * 12/2004 Wu ............................ 180/65.5

FOREIGN PATENT DOCUMENTS

DE        3414579 A1 *   4/1984

* cited by examiner

*Primary Examiner*—Kevin Hurley
(74) *Attorney, Agent, or Firm*—Rosenberg, Klein & Lee

(57) ABSTRACT

A turning device for a wheel set includes a handle strut and an axle pipe. The handle strut comprises a connecting tube at the bottom. The connecting tube comprises swirl tubes at respective ends. Each swirl tube has restricting members. The axle pipe comprises a receiving base corresponding to the connecting tube. The receiving base comprises lids at respective sides. The lids comprise restricting members corresponding to the restricting members of the swirl tubes. The lids and the receiving base comprise through holes for insertion of fasteners to secure the lids to the receiving base. By means of the restricting members, the receiving base and the swirl tubes may be turned with respect to each other to a limited angle. The restricting members are lugs and troughs.

5 Claims, 4 Drawing Sheets

TURNING DEVICE FOR A WHEEL SET

BACKGROUND OF THE INVENTION

1. Field of the Invention

This invention relates to a turning device for a wheel set applied to a kick scooter or a children's tricycle, which is free to turn at a certain angle without the risk of turning over.

2. Description of Prior Art

A conventional kick scooter on the market uses a handle to turn the scooter. The scooter has a handle strut extending downwardly and through the front end of the frame. The lower end of the handle strut is pivotally connected to a front wheel. By turning the handle, the front wheel will be turned right or left. This design has no restriction to the turning angle, and the rider may fall easily.

Whether two wheels are used in the front or in the rear on certain kick scooters or children's tricycles, a single-wheel turning mechanism is adopted. In case of a wild turning, either of the front or rear wheels, i.e., the outside one, can easily leave the ground to cause the scooter to turn over. Therefore, it is necessary to limit the turning angle to stay within a safe range.

SUMMARY OF THE INVENTION

The primary purpose of the present invention is to provide a turning device for a wheel set, which is free to turn at a certain angle, free of risk of turning over due to wild swing, compact in construction and at low production cost. To achieve the purpose, the present invention includes a handle strut and an axle pipe.

The handle strut comprises a connecting tube at the bottom. The connecting tube comprises restricting members at respective ends.

The axle pipe comprises a receiving base corresponding to the connecting tube. The receiving base comprises lids at respective sides. The lids comprise restricting members corresponding to the restricting members of the connecting tube. The lids are secured to the receiving base.

The restricting members are lugs and troughs.

The connecting tube is provided with swirl tubes at respective ends. Each of the swirl tubes comprises lugs thereof.

The lids and the receiving base comprise through holes corresponding with each other for insertion of fasteners to secure the lids to the receiving base.

DETAILED DESCRIPTION OF THE PREFERRED EMBODIMENT

Figure 1:
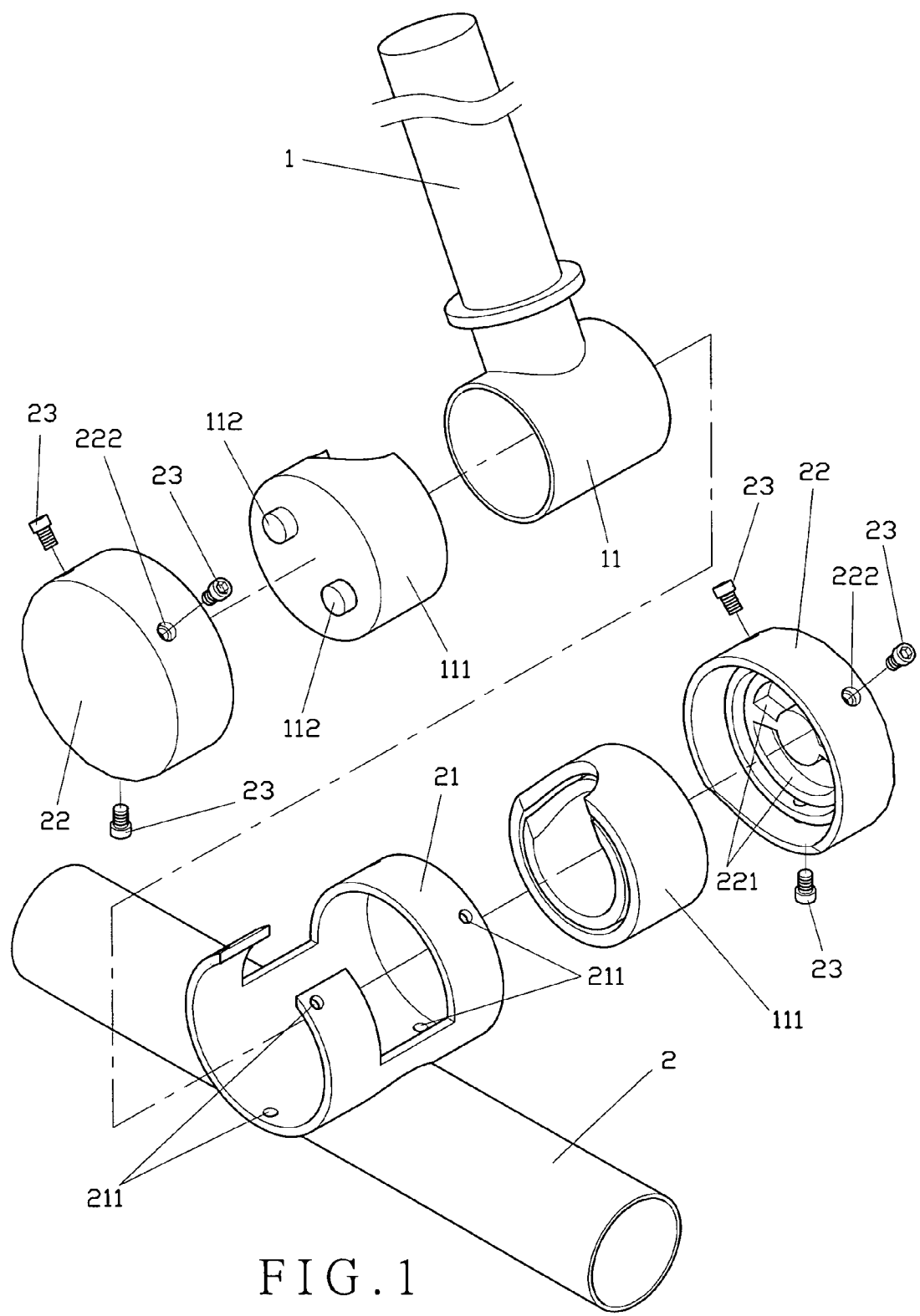
FIG. 1 is an exploded view of the present invention.
Figure 2:
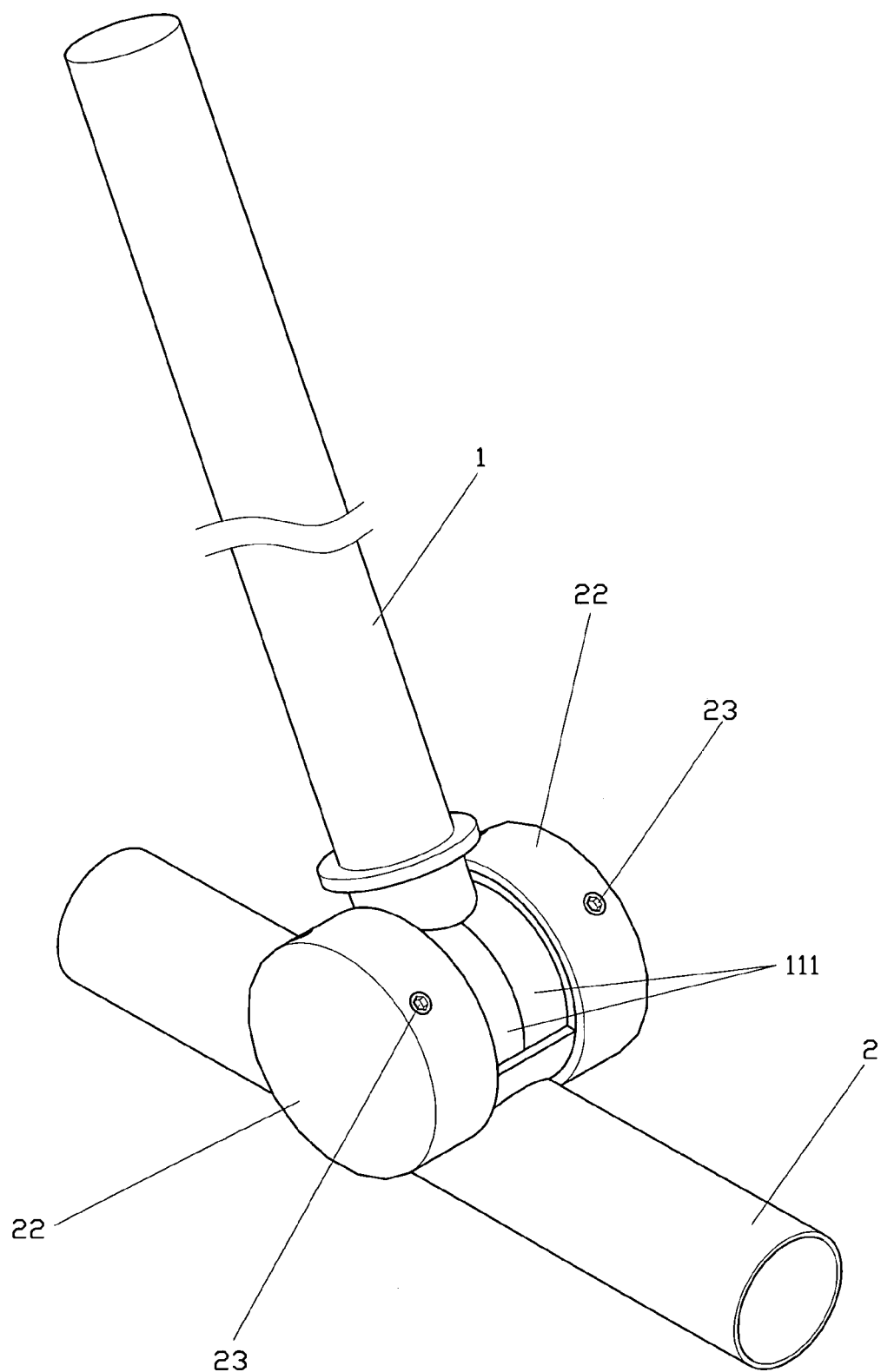
FIG. 2 is a perspective view of the present invention.

As shown in FIGS. 1 and 2, the present invention comprises a handle strut 1 and an axle pipe 2.

The handle strut 1 comprises a connecting tube 11 at the bottom. The connecting tube 11 is provided with a pair of swirl tubes 111 at respective ends. Each of the swirl tubes 111 has restricting members. In the preferred embodiment, the restricting members are lugs 112.

The axle pipe 2 comprises a receiving base 21 corresponding to the connecting tube 11. The receiving base 21 is provided with a pair of lids 22 at respective sides. Each of the lids 22 comprises restricting members corresponding to the lugs 112. In the preferred embodiment, the restricting members are troughs 221. The lids 22 and the receiving base 21 comprise through holes 222 and 211 for insertion of fasteners 23 to secure the lids 22 to the receiving base 21.

Figure 3:
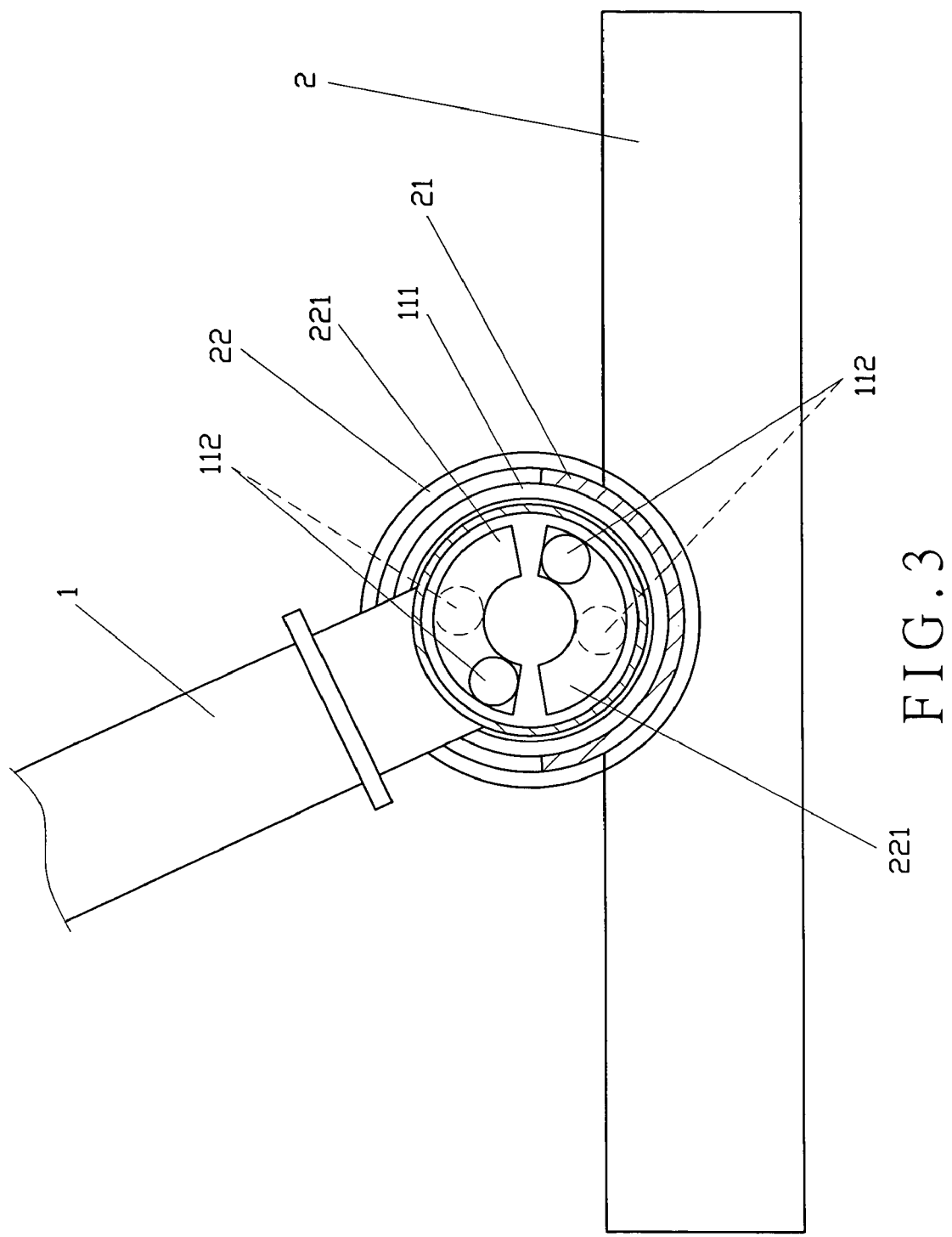
FIG. 3 is a cross-sectional view of the present invention.

As shown in FIG. 3, the connecting tube 11 of the handle strut 1 is inserted into the receiving base 21 of the axle pipe 2. The restricting members of the connecting tube 11 will be located in the restricting members of the lids 22 in a slidable manner to confine its turning angle. In the preferred embodiment, the lugs 112 are located in the troughs 221 and restricted by the troughs 221 to turn at a certain angle, providing a limited angle to the handle strut 1 in turning.

Likewise the restricting members of the connecting tube 11 may be troughs, and the restricting members of the axle pipe 2 may be lugs.

Figure 4:
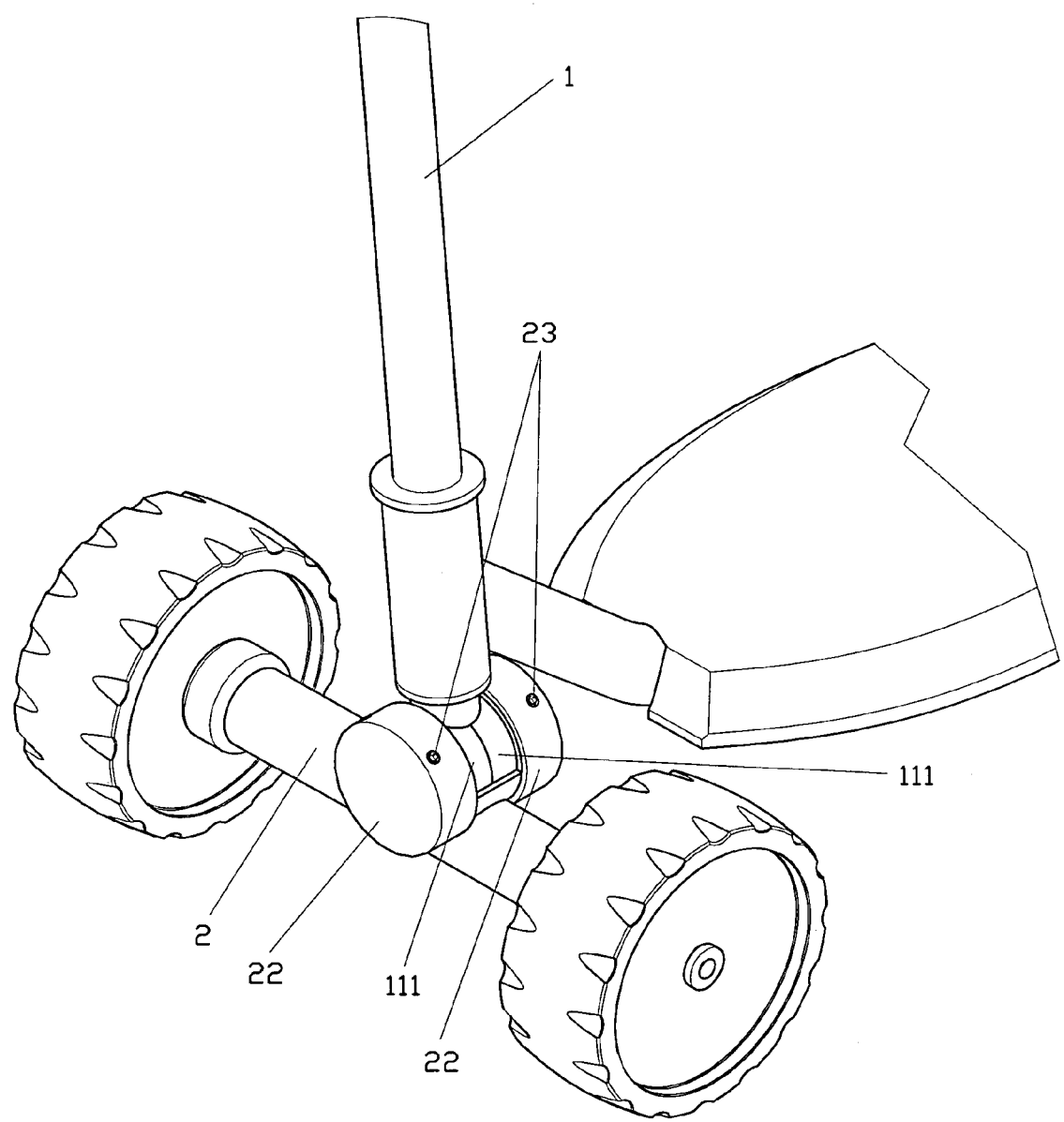
FIG. 4 is a perspective view showing the present invention applied to a scooter.

When the present invention is applied to a scooter, as shown in FIG. 4, a front wheel set incorporated with the handle strut 1 and the axle pipe 2 can be turned freely at a certain angle without the risk of turning over.

Further, this present invention can be applied to a rear wheel set, allowing the rear wheel set to run in a safety way.

I claim:

1. A turning device for a wheel set comprising a handle strut and an axle pipe;

said handle strut comprising a connecting tube at the bottom, said connecting tube comprising restricting members at respective ends;

said axle pipe comprising a receiving base corresponding to said connecting tube, said receiving base comprising lids at respective sides, said lids comprising restricting members corresponding to said restricting members of said connecting tube to confine turning movement of said lids with respect to said connecting tube, said lids being secured to said receiving base.

2. The turning device for a wheel set, as recited in claim 1, wherein said restricting members of said connecting tube are lugs, and said restricting members of each of said lids are troughs.

3. The turning device for a wheel set, as recited in claim 1, wherein said restricting members of said connecting tube are troughs, and said restricting members of each of said lids are lugs.

4. The turning device for a wheel set, as recited in claim 1, wherein said connecting tube is provided with swirl tubes at respective ends, each of said swirl tubes comprising lugs thereof.

5. The turning device for a wheel set, as recited in claim 1, wherein said lids and said receiving base comprise through holes corresponding with each other for insertion of fasteners to secure said lids to said receiving base.

* * * * *